United States Patent [19]
Bessel

[11] Patent Number: 6,147,669
[45] Date of Patent: Nov. 14, 2000

[54] METHOD AND APPARATUS FOR COMMUNICATING STATUS AND CONTROL INFORMATION BETWEEN A PROCESSOR AND A DISPLAY DEVICE

[75] Inventor: David H. Bessel, Poway, Calif.

[73] Assignees: Sony Corporation, Tokyo, Japan; Sony Electronics, Inc., Park Ridge, N.J.

[21] Appl. No.: 08/134,274

[22] Filed: Oct. 8, 1993

[51] Int. Cl.$^7$ .................................................. G09G 5/00
[52] U.S. Cl. .......................................... 345/112; 348/473
[58] Field of Search .................................... 348/483–486, 348/189, 190, 473, 476–479; 345/3, 112, 132, 204, 207, 82, 44

[56] References Cited

U.S. PATENT DOCUMENTS

| | | | |
|---|---|---|---|
| 3,898,636 | 8/1975 | Smith | 340/225 |
| 3,984,862 | 10/1976 | Volz | 348/189 |
| 3,993,861 | 11/1976 | Baer | 178/5.6 |
| 4,277,797 | 7/1981 | Danschat et al. | 348/189 |
| 4,308,557 | 12/1981 | Dieterich | 348/478 |
| 4,631,586 | 12/1986 | Gennetten et al. | 348/476 |
| 4,644,399 | 2/1987 | McCord et al. | 348/479 |
| 4,654,706 | 3/1987 | Davidson | 348/190 |
| 4,851,826 | 7/1989 | Davis | 345/132 |
| 4,897,721 | 1/1990 | Young et al. | 348/190 |
| 5,162,785 | 11/1992 | Fagard | 345/207 |

OTHER PUBLICATIONS

"Thesaurus of Computer Science", Arthur Goodman, Barnes & Noble, 1984, p. 232.

*Primary Examiner*—Regina Liang
*Attorney, Agent, or Firm*—Limbach & Limbach L.L.P.

[57] ABSTRACT

A method and apparatus for communicating control data (such as configuration, adjustment, or alignment data) to an internal digital processor of a display device from an external processor, and for communicating status data from the internal digital processor to the external processor. In accordance with the invention, a display signal (e.g., an analog video signal or a synchronization signal associated therewith) is encoded with digital control data. An internal digital processor in the display device receives the encoded display signal and extracts the control data therefrom. In preferred embodiments, the display device is a video monitor, and one or more of the video and video sync signals supplied to the monitor are encoded with control data, which can include a video test signal from a video signal generator, or configuration, alignment, or adjustment data. In preferred embodiments, the display device includes a pilot lamp and the internal digital processor in the display device encodes electromagnetic radiation emitted from the pilot lamp with status data. The encoded radiation is received by an external detector, which can be removably mounted in a position facing the lamp, and the resulting electrical output of the detector is processed in an external processor to extract the status data. The invention enables communication of control and status data between a display device's internal processor and an external processor without the need for communication hardware in addition to the display device hardware that is conventionally provided.

23 Claims, 1 Drawing Sheet

METHOD AND APPARATUS FOR COMMUNICATING STATUS AND CONTROL INFORMATION BETWEEN A PROCESSOR AND A DISPLAY DEVICE

FIELD OF THE INVENTION

The invention pertains to methods and apparatus for communication between a digital processor and a display device. More particularly, the invention pertains to methods and apparatus for sending control signals from a digital processor to a display device, and for sending status information from the display device to the processor.

BACKGROUND OF THE INVENTION

Throughout the disclosure, including in the claims, the expression "processor" denotes any device within the broad class of data recording apparatus, data processing apparatus, and apparatus for providing control signals to a peripheral device (such as a CRT or other video format display device). Examples of such "processors" include desktop computers, networks of computers, and devices such as printers, magnetic disk storage devices, and digital electronic memory banks.

Throughout the disclosure, including in the claims, the expression "display device" denotes any text or image display device within the broad class of CRT based computer displays, video monitors, and the like, which are controlled by an internal digital processor. Operation of a display device is typically controlled by sending control data (such as configuration, adjustment, or alignment data) to the internal digital processor from an external processor, and the display device is typically capable of sending status data (including information about text or image data stored in the display device) to the external processor.

Alignment and adjustment data must be transmitted to and from a display device during manufacture or repair of the device, and occasionally during normal operation to adjust the display to produce a best quality image. Alignment data is not itself displayed. Depending on the display device design, usually only a small amount of digital alignment and adjustment data must be transmitted to the display device, and only a smaller amount of status data must be transmitted from the display device, to accomplish alignment or adjustment or both.

In one type of conventional display system, interactive adjustment data (including status and control data) are transferred over a digital communication path (separate from the display signal channel, which can be a color analog video channel) between an internal processor within a display device and an external processor. In such systems, the communication path is implemented by traditional computer communication hardware, such as a serial port in the external processor, a serial port in the display device, and a cable connecting the serial ports. However, inclusion of a serial port in the display device adds cost, because a connector and an interface chip are required, and supporting interface logic and additional power supply capacity are needed to operate the interface hardware.

It would be desirable to communicate such control and status data to and from a display device in a less expensive manner, without the need for special communications hardware such as a serial port and associated hardware.

It is conventional to encode a variety of information in video format, for example, in computer disk back up systems using consumer video recorders, instrumentation recorders using video recording formats, video-text information distribution systems, and authorization systems for subscriber television cable systems. However, until the present invention, control data for a display device has not been encoded in a video signal that is transmitted to the display device.

SUMMARY OF THE INVENTION

The invention is a method and apparatus for communicating control data (such as configuration, adjustment, or alignment data) to the internal digital processor of a display device from an external processor, and for communicating status data (including information about text or image data stored in the display device) from the internal digital processor to the external processor. In accordance with the invention, a display signal (e.g., an analog video signal or other signal for display on the display device or a synchronization signal associated therewith) is encoded with control data. An internal processor in the display device receives the encoded display signal and extracts the control data therefrom.

In preferred embodiments, the display device is a video monitor, and one or more of the video and video sync signals supplied to the monitor are encoded with control data. A general purpose computer (or other encoder means within, or connected with, an external processor) encodes the video or sync signal with control data (such as a video test signal from a video signal generator, or configuration, alignment, or adjustment data).

In preferred embodiments, the display device includes a pilot lamp and the internal digital processor in the display device encodes electromagnetic radiation emitted from the pilot lamp with status data. The encoded radiation (which is encoded optical radiation, in preferred embodiments) is received by an external detector, which can be removably attached in a position facing the lamp, and the resulting electrical output signal from the detector is processed (typically, after it is digitized) in an external processor to extract the status data.

The invention enables communication of control data to a display device's internal processor from an external processor, and status data from the internal digital processor to the external processor, without the need for communication hardware in addition to the display device hardware that is conventionally provided for other purposes (such as pilot lamp hardware and circuitry for receiving the display signal).

DESCRIPTION OF THE PREFERRED EMBODIMENTS

Figure 1:
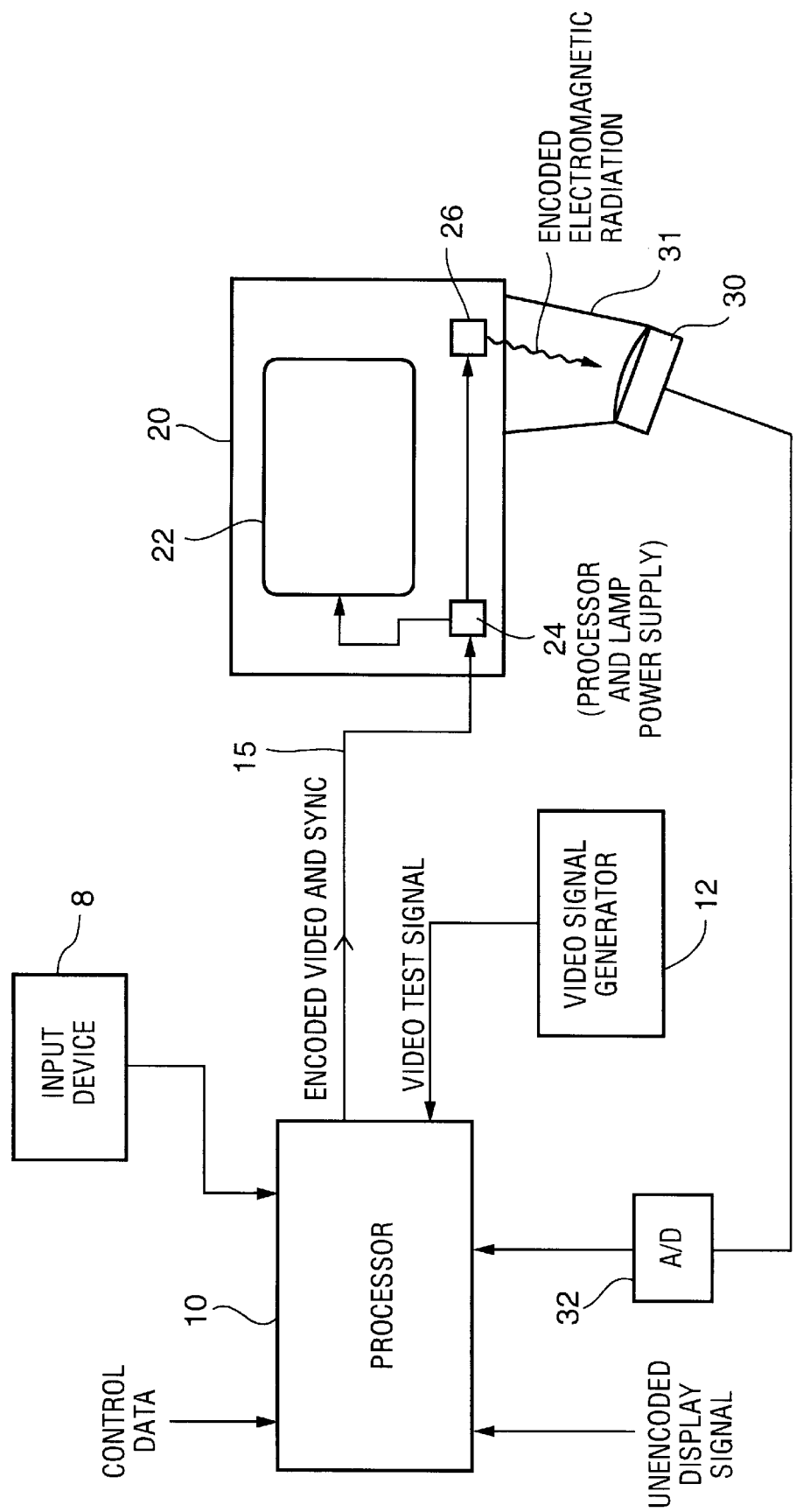
FIG. 1 is a block diagram of a system embodying the invention.

In the FIG. 1 system, processor 10 transmits video and sync signals over display signal communication link 15, to display device 20. Although display signal communication link 15 is referred to below (including in the claims) as a "display signal line" for simplicity, it should be appreciated that communication link 15 can be a single line or cable, a set of lines or cables, a bus, or any other communication link for transmitting one or more display signals to device 20. Processor 10 is an "external" processor in the sense that it is separate from display device 20.

The video and sync signals (indicative of display data) are transmitted over display signal line 15 (from one end line 15 to the other end thereof), received by an internal processor 24 within device 20, and processed by internal processor 24 to generate a video display on display screen 22 of device 20 (the display is indicative of the display data). Pilot lamp 26 (which is typically an LED which emits visible radiation) controlled by processor 24 emits electromagnetic radiation which is indicative of the status of processor 10 or 24. In preferred embodiments, processor 24 is a digital processor.

In accordance with the invention, processor 24 encodes the lamp drive signal (the electrical signal which drives pilot lamp 26) with status data, to modulate the electromagnetic radiation emitted from pilot lamp 26 so as to be indicative of the encoded status data. For example, the encoded lamp drive signal (supplied to lamp 26 from processor 24) can turn on lamp 26 to indicate a binary "1" (of the encoded status data) and turn off lamp 26 to indicate a binary "0" (of the encoded status data). Typically, the encoded lamp drive signal modulates the intensity of radiation emitted from lamp 26, but it can alternatively modulate any other characteristic of the radiation (for example, its frequency or phase).

The modulated radiation emitted from lamp 26 is received by external detector 30, which is typically a photodetector which detects intensity modulations. Preferably, detector 30 is removably mounted in a position which faces lamp 26 and shields lamp 26 and detector 30 from undesirable background radiation, such as by truncated conical-shaped, opaque, removable mount member 31 (which can be a suction cup). The electrical output signal from detector 30 is indicative of the encoded status data, and is processed in external processor 10 to extract the status data therefrom. Typically, the output signal from detector 30 is an analog signal, and it is digitized in analog-to-digital conversion circuit 32 before undergoing digital processing in a digital embodiment of processor 10.

Also in accordance with the invention, processor 10 encodes a display signal supplied to device 20 (e.g., one or more of the video and sync signals sent to device 20 over line 15) with control data. Examples of such control data are configuration, alignment, and adjustment data, and a video test signal from video signal generator 12.

The display signal (prior to encoding) can be a composite video signal, a red, green, or blue video component signal, or a video sync signal transmitted with such a video or video component signal. Processor 10 encodes each display signal to be sent to device 20 in such a manner that the encoded display signal can be sent to device 20 over the same signal line 15 over which it could be sent if not encoded.

Processor 10 preferably encodes the display signal to be sent to display device 20 with control data in the following format: a message preamble (indicating that control data are being sent to display device 20); a message body (containing the control data itself); and a message trailer (indicating the end of control data transmission and including check information to verify the correctness of the message body).

The message preamble (and also the message body and trailer) can be distinguishable from the display (e.g., video or sync) information in any of a variety of ways, including the following (or combinations of the following): it can have a unique (or otherwise distinctive) display format specified in terms of horizontal and/or vertical frequencies (for example, an unused but commonly available, or obsolete, video format such as the CGA format); it can consist of a unique (or otherwise distinctive) set of data values (e.g., sync values) which do not occur in a normal display (video or sync) signal; or it can occur in a section of a display frame which is normally unused (such as in one or more of the horizontal or vertical retrace intervals).

In preferred embodiments, processor 10 is capable of encoding a display signal with one or both the following types of control data: a video test signal from video signal generator 12; and control data (such as alignment data messages) from an external device (such as input device 8 or a computer). In such embodiments, processor 10 encodes the display signal in response to control messages from input device 8 which indicate what control data is to be sent to display device 20.

In operation, display device processor 24 monitors the incoming display signal for a message header, in addition to performing the required signal processing operations for data display. When it identifies a message header, processor 24 decodes the message body and trailer, verifies the correctness of the message, and performs any tasks required to process or implement the message (including, for example, the task of encoding the lamp drive signal with data in response to the message).

Processor 24 (which includes power supply circuitry for providing controlled power to lamp 26) serially encodes the lamp drive signal that it sends to pilot lamp 26 using any appropriate serial encoding technique. In response to the encoded drive signal, lamp 26 emits radiation modulated with serially encoded status data. The radiation is received by detector 30, which can be temporarily mounted over lamp 26, and the output of detector 30 is processed in the manner described above.

A class of embodiments of the inventive method can be implemented without detector 30 or A/D converter 32, using a conventional digital computer as processor 10 and a conventional display device 20. In these embodiments, conventional processor 24 within device 20 is alerted to the existence of a control data transmission from processor 10 by a shift in format of a video display signal received from processor 10 (e.g., a shift from the video format normally employed, such as VGA format, to an unused format, such as CGA format). The message body which includes the encoded control data is the active video portion of the special-format video signal. Software within processor 10 sets up the appropriate special video format in the display card within processor 10, and creates a "video image" which contains the message body. Processor 24 within display device 20 decodes the message and performs the appropriate responsive operations.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A display apparatus, including:

a display signal line having a first end and a second end;

an encoder means connected to the first end, for encoding a display signal with control data thereby generating an encoded display signal, and causing the encoded display signal to propagate from the first end to the second end, wherein the display signal is indicative of display data, the encoded display signal is indicative of both the display data and the control data, and the control data include a video test signal; and a display device including an internal processor connected to the second end, wherein the internal processor receives and processes the display data of the encoded display signal to generate a display indicative of said display data and extracts the control data from the encoded display signal for controlling operation of the display device.

2. A display apparatus, including:

a display signal line having a first end and a second end;

an encoder means connected to the first end, for encoding a display signal with control data thereby generating an encoded display signal, and causing the encoded display signal to propagate from the first end to the second end, wherein the display signal is indicative of display data, the encoded display signal is indicative of both the display data and the control data, and the control data include alignment data; and a display device including an internal processor connected to the second end, wherein the internal processor receives and processes the display data of the encoded display signal to generate a display indicative of said display data and extracts the control data from the encoded display signal for controlling operation of the display device, wherein the display device includes a pilot lamp connected to the internal processor, wherein the internal processor supplies a lamp drive signal to the pilot lamp, and wherein the pilot lamp emits modulated radiation encoded with status data in response to the lamp drive signal.

3. The apparatus of claim 2, also including:

a detector positioned for receiving the modulated radiation from the pilot lamp and generating an output signal in response thereto; and means for processing the output signal to extract the status data therefrom.

4. The apparatus of claim 3, also including:

means for removably mounting the detector to the display device in a position facing the pilot lamp.

5. The apparatus of claim 4, wherein the means for removably mounting the detector is a suction cup.

6. The apparatus of claim 2, wherein the pilot lamp is an LED which emits modulated visible radiation in response to the lamp drive signal.

7. A display apparatus, including:

a display signal line having a first end and a second end;

an encoder means connected to the first end, for encoding a display signal with control data thereby generating an encoded display signal, and causing the encoded display signal to propagate from the first end to the second end, wherein the display signal is indicative of display data, the encoded display signal is indicative of both the display data and the control data, and the control data include alignment data; and a display device including an internal processor connected to the second end, wherein the internal processor receives and processes the display data of the encoded display signal to generate a display indicative of said display data and extracts the control data from the encoded display signal for controlling operation of the display device, wherein the encoded display signal includes a message preamble indicating commencement of control data transmission, a message body comprising the control data, and a message trailer indicating the end of control data transmission.

8. The apparatus of claim 7, wherein the message preamble is in a distinctive display format distinguishable by the internal processor.

9. The apparatus of claim 8, wherein the distinctive display format is specified in terms of horizontal and vertical frequencies.

10. The apparatus of claim 9, wherein the distinctive display format is a video format.

11. The apparatus of claim 8, wherein the distinctive display format is specified in terms of horizontal or vertical frequencies.

12. The apparatus of claim 7, wherein the message preamble consists of a distinctive set of data values distinguishable by the internal processor.

13. The apparatus of claim 7, wherein the encoded display signal determines a display frame, and the message preamble is distinguishable by the internal processor because said message preamble occurs in a normally unused portion of the display frame.

14. The apparatus of claim 13, wherein the normally unused portion of the display frame is a retrace interval.

15. A display apparatus, including:

a display screen;

an internal processor for receiving and processing a display signal to generate a display on the display screen in response to the display signal; and a pilot lamp connected to the internal processor, wherein the internal processor supplies a lamp drive signal to the pilot lamp, and wherein the pilot lamp emits modulated radiation encoded with status data in response to the lamp drive signal.

16. The apparatus of claim 15, wherein intensity modulations of the modulated radiation are indicative of the status data, and also including:

a detector positioned for receiving the modulated radiation and generating an output signal indicative of said intensity modulations.

17. The apparatus of claim 16, also including:

means for removably mounting the detector in a position facing the pilot lamp.

18. An apparatus for supplying display data and control data to a display device, wherein the control data are for controlling operation of the display device, including:

a display signal line having a first end for connection to the display device, and a second end; and an encoder means connected to the second end, for receiving a display signal indicative of said display data and encoding the display signal with said control data, thereby generating an encoded display signal indicative of the display data and the control data, and causing the encoded display signal to propagate from the second end to the first end of the display signal line, wherein the display signal is a video signal having a first video format, the encoded display signal includes a message body comprising the control data, and the message body has a second video format.

19. The apparatus of claim 18, wherein the encoded display signal includes a message preamble indicating commencement of control data transmission, and a message trailer indicating the end of control data transmission.

20. The apparatus of claim 19, wherein the message preamble is in a distinctive display format distinguishable from a normally encoded display format.

21. The apparatus of claim 19, wherein the message preamble consists of a distinctive set of data values.

22. The apparatus of claim 19, wherein the encoded display signal determines a display frame, and the message preamble is distinguishable because said message preamble occurs in a normally unused portion of the display frame.

23. The apparatus of claim 22, wherein the normally unused portion of the display frame is a retrace interval.

* * * * *